United States Patent [19]

Zakich

[11] Patent Number: 5,145,353
[45] Date of Patent: Sep. 8, 1992

[54] DUAL ACTION MOLDING PRESS

[75] Inventor: Paul Zakich, Akron, Ohio

[73] Assignee: The Dow Chemical Company, Midland, Mich.

[21] Appl. No.: 712,782

[22] Filed: Jun. 10, 1991

[51] Int. Cl.$^5$ .................. B29C 45/04; B29C 45/28
[52] U.S. Cl. ............................. 425/588; 425/589; 425/450.1; 425/451
[58] Field of Search ............. 425/450.1, 451, 581, 425/589, 588

[56] References Cited

U.S. PATENT DOCUMENTS

| | | | |
|---|---|---|---|
| 2,555,476 | 3/1951 | DuBois et al. | 425/589 |
| 3,671,162 | 4/1972 | Lohmann | 425/245 |
| 3,707,342 | 12/1972 | Lohmann | 425/242 |
| 4,203,359 | 5/1980 | Baltschun | 100/209 |
| 4,408,981 | 10/1983 | Brown | 425/589 |
| 5,052,915 | 10/1991 | Schad et al. | 425/589 |
| 5,055,250 | 10/1991 | Schad et al. | 425/581 |

FOREIGN PATENT DOCUMENTS

90032-065-B 10/1982 Japan .

*Primary Examiner*—Willard Hoag

[57] ABSTRACT

A molding press for simultaneously operating a pair of molds, each having a pair of mold sections (M1, M2; M3, M4), including a base for mounting two horizontally displaced mold sections (M1, M3), each constituting one section of one of the pair of molds, a first bolster for mounting a mold section M2) in alignment for mating engagement with one mold section M1) on the base, a second bolster for mounting a mold section (M4) in alignment for mating engagement with the other mold section (M3) on the base, rod assemblies for interconnecting the first bolster and the second bolster in fixed space relation, for guiding relative movement between the base and the bolsters during opening and closing of the pair of molds, and for mounting pistons operatively interrelated with cylinder assemblies on the base, and an auxiliary cylinder assembly for effecting relative movement between the base and the bolsters for opening of one of the pair of molds while closing the other of the pair of molds and vice versa. The pistons may be provided with fluid transfer bore for selectively providing for relative displacement between the pistons and fluid in the cylinder assemblies.

21 Claims, 5 Drawing Sheets

DUAL ACTION MOLDING PRESS

TECHNICAL FIELD

The present invention relates to presses for molding parts from liquid resins. More particularly, the present invention relates to high output presses for molding parts of large dimensions and heavy weights from various plastic resins. More specifically, the present invention relates to a multiple cavity dual-action molding press for substantially increasing the production rate of parts which can be achieved by a single press.

BACKGROUND ART

While presses according to the instant invention may have utility in regard to injection molding and reaction injection molding (RIM) processes, a particular area of applicability resides in the production of reinforced plastic parts or products that are composite structures in which a resin, either thermosetting or thermoplastic, is combined with a reinforcing member to strengthen and improve various properties of the plastic matrix. Particularly useful processes include resin transfer molding (RTM) and structural reaction injection molding (S-RIM). The former usually employ epoxies or polyester resins, although other thermosetting resins can also be employed. Polyurethanes are employed in S-RIM systems.

Both processes commonly employ a fiber preform or mold charge blank which may approximate the shape of the composite products or at least provides a structural backbone for the product. The mold charge blank is placed inside of a multiple-piece mold, after which the liquid resin or reaction components are transferred into the closed mold to impregnate the reinforcement material and fill all void space within the mold. After the necessary reaction and cure time for the particular resin, the mold is opened, and the finished composite product is removed.

Such composite products are currently of particular interest and importance in a variety of industrial applications, such as the automotive industry, where features such as weight reduction, strength, appearance, durability, flexibility, and consolidation of parts are significant design considerations. Automobile bumpers, for instance, made of polyurethanes reinforced with fibers from a mold charge blank, provide improved performance characteristics, particularly strength, and may also reduce the total weight and number of parts required.

Fiber mold charge blanks are manufactured separately and are supplied to the mold for combination with the liquid resin component(s). A variety of methods have been employed for making mold charge blanks, including the spraying of chopped fibers onto a molded surface and the forming of reinforcing mat or fabric in desired thickness and layers into the shape of the mold charge blank. The fiber material is normally combined with a thermoplastic binder material, and the "laid up" material is then placed in a preheat oven, transferred to a mold, pressed by the mold to the desired shape, and cooled to produce the actual mold charge blank which can be handled and stored until final manufacture. The binder material stiffens the mold charge blank, giving it appropriate structural integrity for liquid molding in the forming tool or handleability for storage or transfer to the final mold where resin transfer occurs.

Advances in automating the production of mold charge blanks have made the final molding process a primary limiting factor in the productivity of relatively large products requiring molds having projected area dimensions which may be on the order of 50 square feet. The final molding process is severely limited in a time sense due primarily to the reaction and cure time of the resins which may be on the order of ten seconds to a few minutes. Further, due to the size, weight, and complexity of the molds, most presses for such relatively large products employ very large and highly expensive hydraulic systems. Such hydraulic systems are necessary in order to achieve acceptable press closure speeds and to provide sufficient clamping forces over the extensive mold areas such that mold flash is eliminated or is reduced to a minimum.

Although the prior art relating to molding presses of this general type is extensive, very little of the known art appears to be directed to the combination of factors involved in achieving the molding of large parts at high production rates. For small parts, double-acting horizontal presses have been proposed employing a pair of spaced, fixed bases with a pair of bolsters supported on tie rods positioned outwardly of the bases for alternately opening and closing two molds. Horizontal presses having two bases and three bolsters to operate two molds independently by complex hydraulic controls have also been proposed. Both horizontal and vertical presses for simultaneously opening and closing two molds by a variety of mechanical arrangements are also known in the art. Other presses have employed complex hydraulic systems with large numbers of cylinders or complex fluid transfer systems to accommodate larger clamping force requirements. None of these approaches, however, lend themselves to the production of large parts at high production rates in a press configuration having flexibility in operation, reasonable size, and an attractive manufacturing cost.

DISCLOSURE OF THE INVENTION

Therefore, and object of the present invention is to provide a dualaction press for molding resins by injection molding, RIM, S-RIM, and RTM processes which achieves greatly improved productivity in terms of the number of parts produced over a given time interval. Another object of the present invention is to provide such a press which has a plurality of molds in which parts may be alternately molded, thereby reducing the capital investment and floor space requirements in comparison with use of a plurality of presses where each mount a single mold. A further object of the invention is to provide such a press which may be arranged such that a single pumping and metering system for the resins may service the molds, thereby reducing the number of such systems normally required.

Another object of the present invention is to provide a press for such molding processes which is of the horizontal type and in which the movable bolster(s) are roller mounted, whereby the driving force and, therefore, the energy consumption necessary to operate the press are greatly reduced since only friction and inertial forces need be overcome. Still another object of the present invention is to provide such a press wherein the movable bolster(s) do not require elaborate, heavy-duty safety locking devices to preclude uncontrolled movement of the bolster(s) in the event of a failure in the press drive system since gravity forces do not tend to move bolster(s) to the press closed position. A further object of the present invention is to provide such a press which eliminates the need for the high pressure, high flow capacity, and high powered hydraulic systems normally employed with the inherent high noise levels and propensity for hydraulic fluid leaks with attendant contamination problems and maintenance requirements.

A further object of the present invention is to provide a press for such molding processes which may be sized to accommodate molds that are considered relatively large in having projected areas on the order of fifty (50) square feet or more. Another object of the invention is to provide such a press which incorporates hydraulic cylinders sized and arranged to provide sufficient uniform clamping force to prevent mold separation and the resultant flash formation even when clamping forces in the range of five hundred (500) tons or more are required. Still a further object of the invention is to provide such a press that can accommodate large molds having deep cavities which require large daylight openings for part removal, thereby requiring an extended stroke for the opening and closing movements of the press. Yet another object of the invention is to provide such a press which will accommodate molds of such sizes and cavity depths while maintaining or exceeding conventional opening and closing speeds on the order of a few seconds.

Another object of the present invention is to provide a press for such molding processes, wherein the opening and closing motion is effected by four hydraulic cylinders which are integral components of the press and preferably positioned on the four corners of the generally rectangular base and bolsters to assure tight mold closure. A further object of the invention is to provide such a press wherein the rods of the hydraulic cylinders serve as press guide rods and mount the pistons for the hydraulic cylinders substantially medially thereof. A still further object of the invention is to provide such a press wherein the dual-action arrangement permits the injection and cure cycle to take place in one closed mold while the other mold is open to permit molded part removal and mold cleaning and spraying of mold release material, as necessary.

Another object of the present invention is to provide a press for such molding processes which has an alternate form of hydraulic cylinder arrangement that selectively permits relative displacement between the pistons and the hydraulic fluid in the cylinder casing by bores located in the pistons. A further object of the invention is to provide such a cylinder arrangement which greatly reduces the volumetric flow of hydraulic fluid necessary during opening and closing of the press, whereby large, high volume, and high velocity hydraulic components and large piping which would otherwise be required may be eliminated. Another object of the present invention is to provide such a cylinder arrangement which greatly reduces the size and the cost of the hydraulic power units, motors, valves, piping and tubes, and sundry components which otherwise would necessitate a mammoth hydraulic system costing approximately forty percent (40%) of the total cost of a press of the size contemplated herein in present system configurations. Still another object of the invention is to provide such a cylinder arrangement wherein mold clamping may be effected by the hydraulic cylinder arrangement, and press opening and closing may be powered by an auxiliary, substantially smaller cylinder(s).

Still another object of the present invention is to provide a press for such molding processes which may employ conventional molds and known gantry style robots for part handling, mold cleaning, and mold release spraying functions. A further object of the invention is to provide such a press which will mold very large parts, yet does not require extended ceiling heights for overhead clearance. Still another object of the invention is to provide such a press which, by its physical arrangement, reduces the possibility of mold contamination from oil leaking from hydraulic components and from removing flash from the molds. Yet a further object of the invention is to provide such a press which can apply tonnage in a range of from zero to a maximum rated loading which is not possible in conventional vertical presses.

At least one or more of the foregoing objects, together with the advantages thereof over known press apparatus for the molding of parts of resins, which will become apparent from the specification which follows, are accomplished by the present invention.

In general the present invention contemplates a molding press for simultaneously operating a pair of molds, each having a pair of mold sections including, a base for mounting two horizontally displaced mold sections, each constituting one section of one of the pair of molds, a first bolster for mounting a mold section in alignment for mating engagement with one mold section on the base, a second bolster for mounting a mold section in alignment for mating engagement with the other mold section on the base, rod assemblies for interconnecting the first bolster and the second bolster in fixed space relation, for guiding relative movement between the base and the bolsters during opening and closing of the pair of molds, and for mounting pistons operatively interrelated with cylinder assemblies on the base, and an auxiliary cylinder assembly for effecting relative movement between the base and the bolsters for opening of one of the pair of molds while closing the other of the pair of molds and vice versa.

The present invention further contemplates a high fluid capacity double acting power cylinder including, a cylinder casing, a cylinder rod extending into the cylinder casing, a piston in the cylinder casing on the cylinder rod ducts selectively supplying fluid to the cylinder casing, fluid transfer bores in the piston for selectively providing for relative displacement between the piston and the fluid in the cylinder casing.

PREFERRED EMBODIMENT FOR CARRYING OUT THE INVENTION

Figure 1:
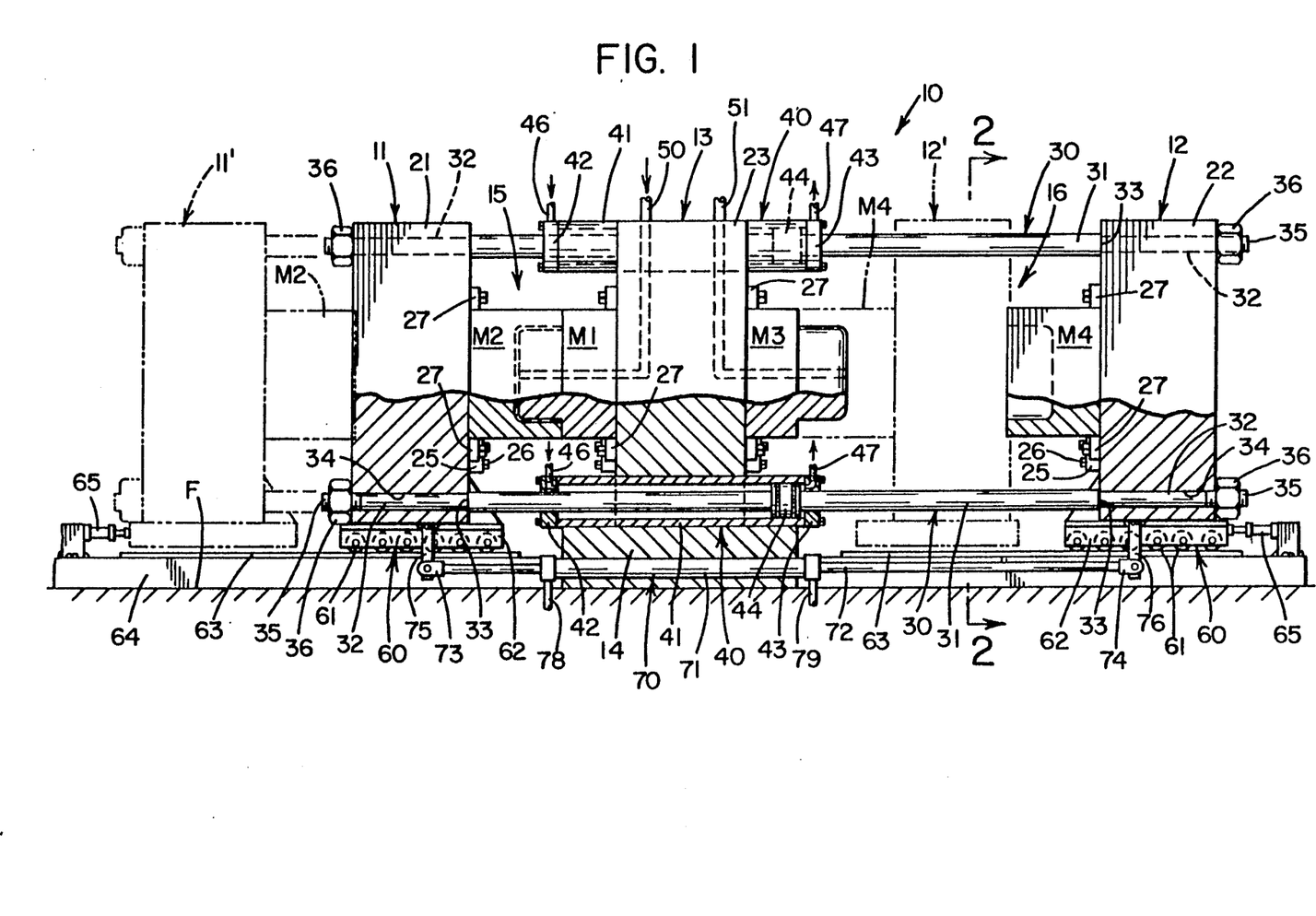
FIG. 1 is a front elevational view, with portions broken away and in section, of an exemplary molding press embodying the concepts of the present invention and showing the left side bolster in the mold closed position and the right side bolster in the mold open position.

A press for resin molding processes according to the concepts of the present invention is generally indicated by the numeral 10 in the drawing figures. As best seen in FIG. 1 of the drawings, the press 10 is shown in a form commonly referred to as a horizontal press configuration in that the base and bolsters are horizontally displaced relative to each other. As will be detailed hereinafter, the platens are controllably horizontally moved in effecting the requisite opening and closing movements of the press 10.

As shown, the press 10 has a first bolster assembly, generally indicated by the numeral 11, and a second bolster assembly, generally indicated by the numeral 12, which is positioned in spaced parallel alignment with the first bolster assembly 11. Interposed between the first bolster assembly 11 and the second bolster assembly 12 is a base assembly, generally indicated by the numeral 13. As will be appreciated from the following description, the first bolster assembly 11 and the second bolster assembly 12 are mounted for simultaneous coordinated movement relative to the base assembly 13.

The bolster assemblies 11, 12 and the base assembly 13 are configured to mount a plurality of molds of the type conventionally employed for the particular molding process to be carried out. As best seen in FIG. 1, the press 10 has a pair of mold mounting spaces, generally indicated by the numerals 15 and 16. The mold mounting space 15 is disposed between the first bolster assembly 11 and the base assembly 13, and the mold mounting space 16 is disposed between the second bolster assembly 12 and the base assembly 13. For exemplary purposes, conventional molds are schematically depicted in operative position in the mold mounting spaces 15, 16. In particular, the base assembly 13 is shown mounting a pair of male mold sections M1 and M3 in back-to-back relation. Mating female mold sections M2 and M4 are mounted on the first and second bolster assemblies 11 and 12, respectively, in opposed relationship to the male mold section M1 and M3 for mating engagement therewith. The construction, positioning, and operation of suitable molds for molding resins is well known to persons skilled in the art. It will be appreciated that with the bolster assemblies 11, 12 in the solid line position depicted in FIG. 1, the mold sections M1, M2 in the mold mounting space 15 are in the closed or mating position, while the mold sections M3, M4 in the mold mounting space 16 are in the open or spaced position. Alternately, in the chain line position of the first bolster assembly 11' and the second bolster assembly 12' the mold sections M1, M2 in the mold mounting space 15 are in the open position, and the mold sections M3, M4 in the mold mounting space 16 are in the closed position.

Figure 2:
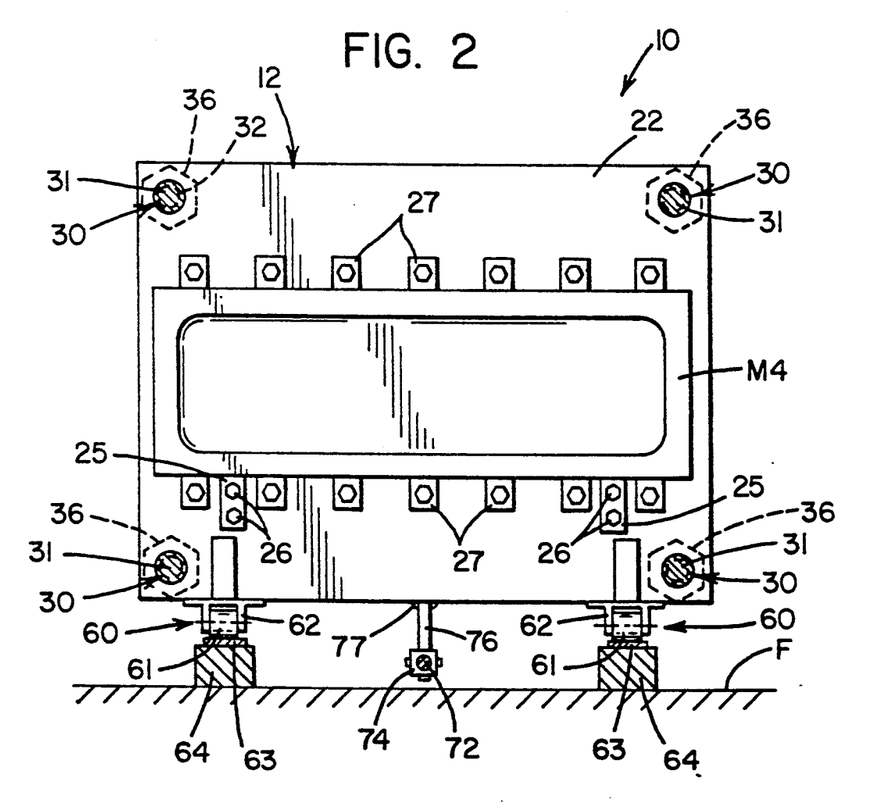
FIG. 2 is an enlarged cross-sectional view taken substantially along the line 2—2 of FIG. 1, showing the positioning of a mold section on the right side bolster and the relation to the guide rods and track and wheels that support the bolster.

As shown particularly in FIGS. 1 and 2 of the drawings, the first and second bolster assemblies 11, 12 and the base assembly 13 are substantially rectangular block members of conventional structural material of the type employed for the application of the requisite clamping tonnage without deformation which could result in the formation of unacceptable mold flash during the molding operation. The mold sections M1, M2, M3, and M4 are operatively positioned on the block members 21, 22, 23 of the bolster assemblies 11, 12 and base assembly 13 for precise mating engagement between the mold sections M1, M2 and M3, M4. As shown, the block members 21, 22, and 23 may be provided with a plurality of rest blocks 25. As shown, for example, in FIG. 2, at least two spaced rest blocks 25 may be provided with respect to each of the mold sections M1, M2, M3, and M4 principally for supporting the major portion of the weight thereof. The rest blocks 25 are precisely positioned and firmly attached to the block members 21, 22, and 23 as by suitable bolts 26. Retention of the mold sections M1, M2, M3, and M4 flush against the block members 21, 22, 23 in precise mating alignment is effected by a plurality of conventional mold tow clamps 27. As seen in FIGS. 1 and 2, a plurality of mold tow clamps 27 are positioned at intervals along both the upper and lower peripheries of each of the mold sections M1, M2, M3, and M4. The molds sections M1, M2, M3, and M4 are thus supported and retained in their requisite positions for conduct of the molding operation by the press 10.

The first bolster assembly 11 is spaced from and joined to the second bolster assembly 12 by a plurality of rod assemblies, generally indicated by the numeral 30. As seen in FIGS. 1 and 2, there are four rod assemblies 30 which interrelate with the bolsters 11, 12 and bases assembly 13 preferably proximate to the corners of the block members 21, 22, and 23, as best seen in FIG. 2. Each of the rod assemblies 30 includes an elongate guide rod 31 extending between and attached to the first bolster assembly 11 and the second bolster assembly 12. As shown, the guide rods 31 have a reduced diameter portion 32 proximate the axial extremities thereof forming annular flanges 33 which engage the mold mounting surfaces of the block members 21, 22. The block members 21, 22 have bores 34 to receive the reduced diameter portions 32 of rods 31 which pass therethrough. The axial extremities of the guide rods 31 have threads 35 for receiving retaining nuts 36. The block members 21 and 22 are thus clamped onto the guide rods 31 between the annular flanges 33 and the retaining nuts 36. It will, thus, be appreciated that the first bolster assembly 11 and the second bolster assembly 12 are interconnected to form a rigid rectangular structure.

The rod assemblies 30 interrelate with cylinder assemblies, generally indicated by the numeral 40, mounted on the block member 23 of base assembly 13. The cylinder assemblies 40 include elongate cylinder casings 41 which are rigidly affixed to the block member 23 of base assembly 13 as by welds (not shown). The cylinder casings 41 each have rod end caps 42 and 43 at each axial extremity thereof through which the guide rods 31 of rod assemblies 30 project. The guide rods 31 each carry a piston 44 which is selectively movable axially within the cylinder casing 41 of the cylinder assemblies 40. Each of the rod end caps 42, 43 have ducts 46 and 47, respectively, for the ingress and egress of fluid to the interior of the cylinder casings 41, as controlled by conventional hydraulic systems known to persons skilled in the art to effect the actuation of press 10 in the manner described hereinafter.

In the form of the invention depicted in FIG. 1 of the drawings, the base assembly 13 includes a pad 14 which is attached to the block member 23 as by welds (not shown). The pad 14 is positioned on a foundation F which supports the entire press 10. It is to be understood that the pad 14 and thus the block member 23 and the entirety of base assembly 13 remain fixed at all times.

It is to be noted that with the form of the invention of FIG. 1, a single conventional pumping and metering system (not shown) for injecting the reactive liquid resins may conveniently be mounted on or in proximity to the base assembly 13. With such an arrangement, the reactive liquid resin may readily be supplied through ports 50 and 51 in the block member 23 of base assembly 13. As seen in FIG. 1, the port 50 may terminate in the male mold M1 in the mold mounting space 15, and the port 51 may terminate in the male mold M3 in the mold mounting space 16. Conventional valving (not shown) may be employed to supply the liquid resin to the ports 50, 51 in metered quantities and at appropriate times for injection into the two molds in the mold mounting spaces 15, 16.

In the form of the invention depicted in FIGS. 1 and 2 of the drawings, the first bolster assembly 11 and the second bolster assembly 12 are movable relative to the fixed base assembly 13 by virtue of transport assemblies 60. The transport assemblies 60 consist of an array of wheels 61 which extend axially at least a portion of the length of the block members 21, 22 or, as shown, an extent beyond (see FIG. 1). The wheels 61 may advantageously be mounted in an elongate framework 62 (see FIG. 2). Two of the frameworks 62 may be mounted to the underside of each of the bolster assemblies 11, 12, preferably spaced a substantial distance such as to impart lateral stability to the bolster assemblies 11, 12. The transport assemblies 60 also include a pair of elongate rails 63 which extend a substantial distance in either direction from the base assembly 13. As seen in FIGS. 1 and 2, the rails 63 are parallel and may be positioned on support beams 64, which repose on the supporting foundation F. It will, thus, be appreciated that the rails 63 provide rolling support for the wheels 61 of the bolster assemblies 11, 12 during their full extent of travel during operation of the press 10. It will be appreciated that some type of linear bearing could be employed to effect the requisite transport motion. If desired, shock absorbers 65 may be positioned on the support beams 64 proximate the axial extremities of the rails 63 to serve as a safety device in the event of the failure of components or control systems for the press 10.

The operation of the press 10 will be largely appreciated by persons skilled in the art based solely on the above description. The press 10 is depicted in solid lines in FIG. 1 with the mold sections M1, M2 in the mold mounting space 15 in the closed position, which has been effected by the ingress of fluid through the duct 46 in rod end cap 42 to the left-hand side of the piston 44 in each of the cylinder casings 41 of cylinder assembly 40. Upon reaching this press closed position seen in FIG. 1, high pressure fluid is supplied via the ducts 46 to operate on the pistons 44 and thus supply the requisite clamping tonnage to the mold sections M1, M2 in the mold mounting space 15. Thereafter, a pumping and metering system supplies a charge of reactive liquid resin through the port 50 in base assembly to the mold cavity defined by the mold sections M1, M2. Thereafter, the press 10 remains in the FIG. 1 position during the requisite cure cycle for the resin.

During the aforedescribed injection and cure cycle in the mold sections M1, M2 in the mold mounting space 15, the mold sections M3, M4 in the mold mounting space 16 are separated or open, as depicted in solid lines in FIG. 1. During this time, part removal, mold cleaning and mold release spraying, if desired, may take place at the mold mounting space 16 as by gantry-style robots or other equipment well known to persons skilled in the art.

Upon the completion of the injection and cure cycle in the mold sections M1, M2 in mold mounting space 15, the press 10 is immediately ready for the closing cycle of the mold sections M3, M4 in mold mounting space 16. The actuation of the press hydraulic system to introduce pressurized fluid into the ducts 47 in the four cylinder casings 41, while relieving the pressurized fluid to the left of the pistons 44 in FIG. 1 through the ducts 46, serves to move the pistons 44 to the left within cylinder casings 41 in FIG. 1 and, thus, move the bolster assemblies 11, 12 to the chain line position depicted in FIG. 1 of the drawings. As will be noted at that time, the mold in the mold mounting space 16 is closed, and the mold in the mold mounting space 15 will be fully open. Thereafter, high pressure fluid introduced through ducts 47 in the cylinder casings 40 applies the requisite clamping tonnage to the mold sections M3, M4 in the mold mounting space 16. Thereafter, resin is introduced, this time through port 51 in block member 23 to the mold cavity defined by the mold sections M3, M4 in mold mounting space 16 to commence the injection and cure cycle in mold mounting space 16. As previously described, contemporaneously with the injection and cure cycle in mold mounting space 16, the open mold sections M1, M2 in mold mounting space 15 may be subjected to part removal, mold cleaning, and mold release spraying.

Thereafter, the molding cycle hereinabove described is repeated with one of the two molds in press 10 being in the injection and curing cycle at all times, except for the few seconds during which the bolster assemblies 11 and 12 are moved and clamping tonnage is applied. The rod end caps 42, 43 of each of the cylinders 40 provide spaced continual alignment of the four guide rods 31 during movement of the bolster assemblies 11, 12 from the solid line position to the chain line position of FIG. 1 and the alternate return travel. It will be appreciated that with the roller mounting assemblies 60 of the bolster assemblies 11, 12, the motions of the bolster assemblies 11, 12 will require only sufficient driving force by cylinder assemblies 40 to overcome the extant inertial forces of the bolster assemblies 11 and 12 and the rod assemblies 30 and the rolling friction of the roller mounting assemblies 60.

It will be appreciated by persons skilled in the art that the very large cylinder assemblies 40 are necessitated in the arrangement of the press 10 solely for purposes of applying clamping tonnage to the molds. Accordingly, it is ordinarily advantageous to employ an auxiliary cylinder assembly, generally indicated by the numeral 70, for purposes of effecting the movement of the bolster assemblies 11, 12. It will be understood that with this preferred arrangement, the four cylinder assemblies 40 will be employed to apply clamping tonnage; however, as will be appreciated by persons skilled in the art, the hydraulic system for the cylinder assemblies 40 may be greatly simplified with this arrangement. The auxiliary cylinder assembly 70 may be similar to the cylinder assemblies 40 except for employing only a single cylinder 71, which may be of a substantially reduced diameter as compared to the cylinder casings 41. As shown, the cylinder 71 is affixed to the pad 14 and is thus stationary. The cylinder 71 has a piston rod 72 which may extend in both directions from cylinder 71 for purposes of attachment to the first bolster assembly 11 and the second bolster assembly 12. As shown, each extremity of the piston rod 72 mounts clevises 73 and 74 that attach to brackets 75 and 76, which are downwardly depending from the first bolster assembly 11 and the second bolster assembly 12, respectively.

As seen in FIGS. 1 and 2, the brackets 75 and 76 may conveniently be mounted substantially laterally medially of and on the underside of the block members 21, 22 of the bolster assemblies 11, 12 to which they are rigidly affixed as by welds 77. The cylinder 71 of auxiliary cylinder assembly 70 is provided with suitable ducts 78 and 79 for displacing the piston (not shown) therein to move the bolster assemblies 11, 12 relative to the base assembly 13, as hereinabove described. It will be appreciated by persons skilled in the art that the auxiliary cylinder assembly 70 could be located other than as depicted in FIGS. 1 and 2, could be attached to only one of the bolster assemblies 11, 12, and could have the cylinder 71 attached to one of the bolsters 11, 12 and the piston rod 72 attached to the base assembly 13. In each of these instances, the requisite motion of the bolster assemblies 11, 12 relative to base assembly 13 could be effected.

It is also to be understood that the first bolster assembly 11 and the second bolster assembly 12 could be fixed, and the base assembly 13 could be movable, while carrying out the same operating characteristics described hereinabove. Such a modified form of the press 10 would be advantageous in terms of the minimum floor space required in that the bolster assemblies 11, 12 would remain in a fixed position. The form of the press 10 depicted in FIG. 1, it will be noted, requires a greater floor space by the approximate amount of the distance the bolsters 11, 12 move from the solid line position to the chain line position depicted in FIG. 1. The arrangement of the press 10 of FIG. 1 is, however, advantageous in regard to injection molding applications in that a single pumping and metering system for the reactive liquid resins may be located in conjunction with the fixed base assembly 13 and yet serve both of the mold mounting spaces 15, 16 via the ports 50, 51. In the arrangement where the bolsters 11, 12 are fixed, it is either necessary in such injection molding applications that a separate pumping and metering system be provided in relation to each of the first bolster assembly 11 and second bolster assembly 12 or that a pumping and metering system be movably mounted, with attendant complications, in conjunction with the base assembly 13.

It is also to be recognized that the press 10 could be configured in such a manner as to be operated in either way described above. In this respect, both the bolster assemblies 11, 12 and the base assembly 13 could be provided with suitable transport assemblies. Further, provision could be made for locking the roller mounting assemblies on either the bolster assemblies 11, 12 or the base assembly 13 to constitute the fixed assembly for a particular mode of operation. Whatever the particular arrangement that may be employed, the press 10 retains the aforedescribed operational advantages of providing extreme flexibility in adapting to a variety of different operational requirements.

Figure 3:
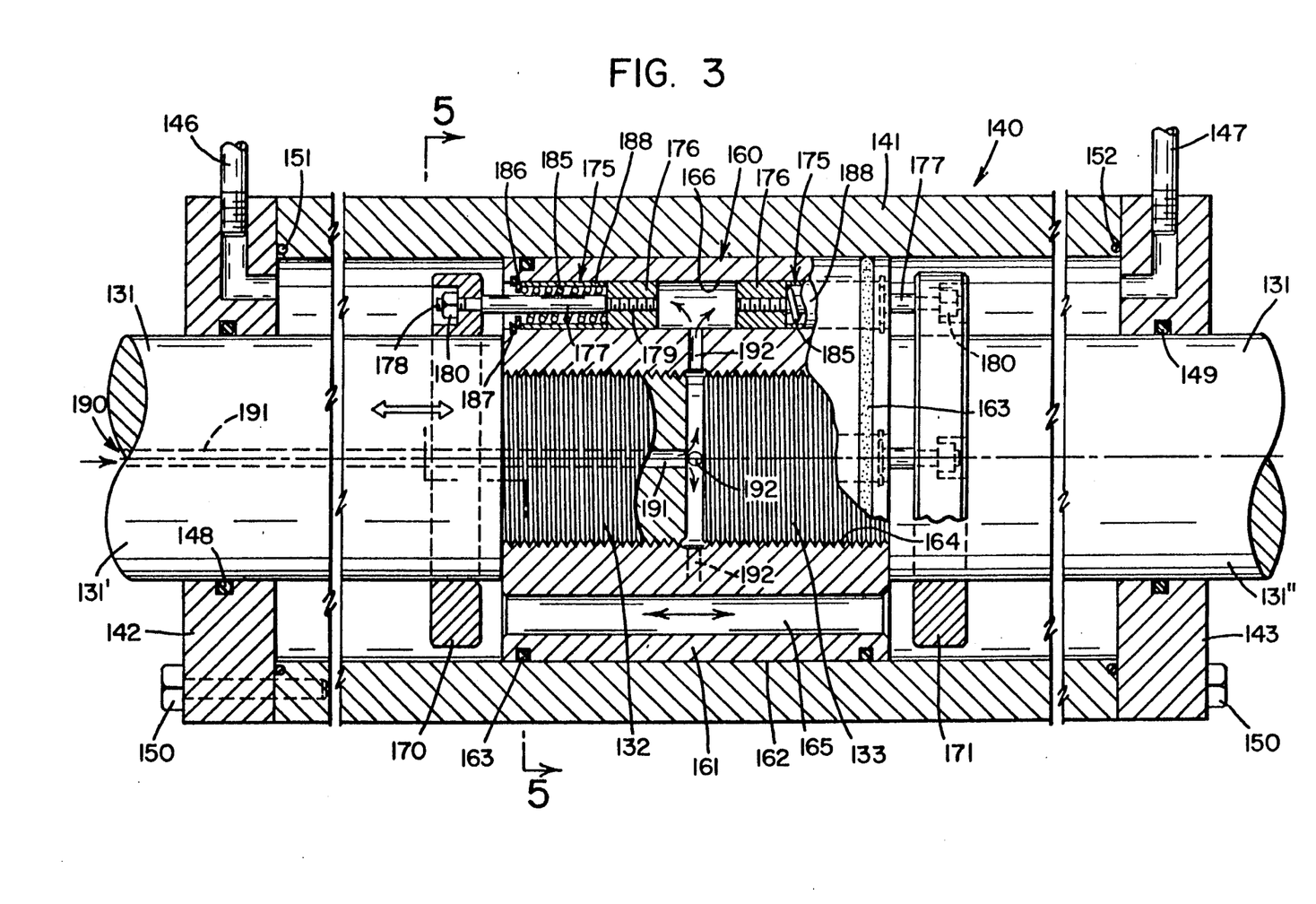
FIG. 3 is a further enlarged fragmentary sectional view of a guide rod and an alternate embodiment of cylinder assembly showing pilot pistons within the piston in the open position.
Figure 4:
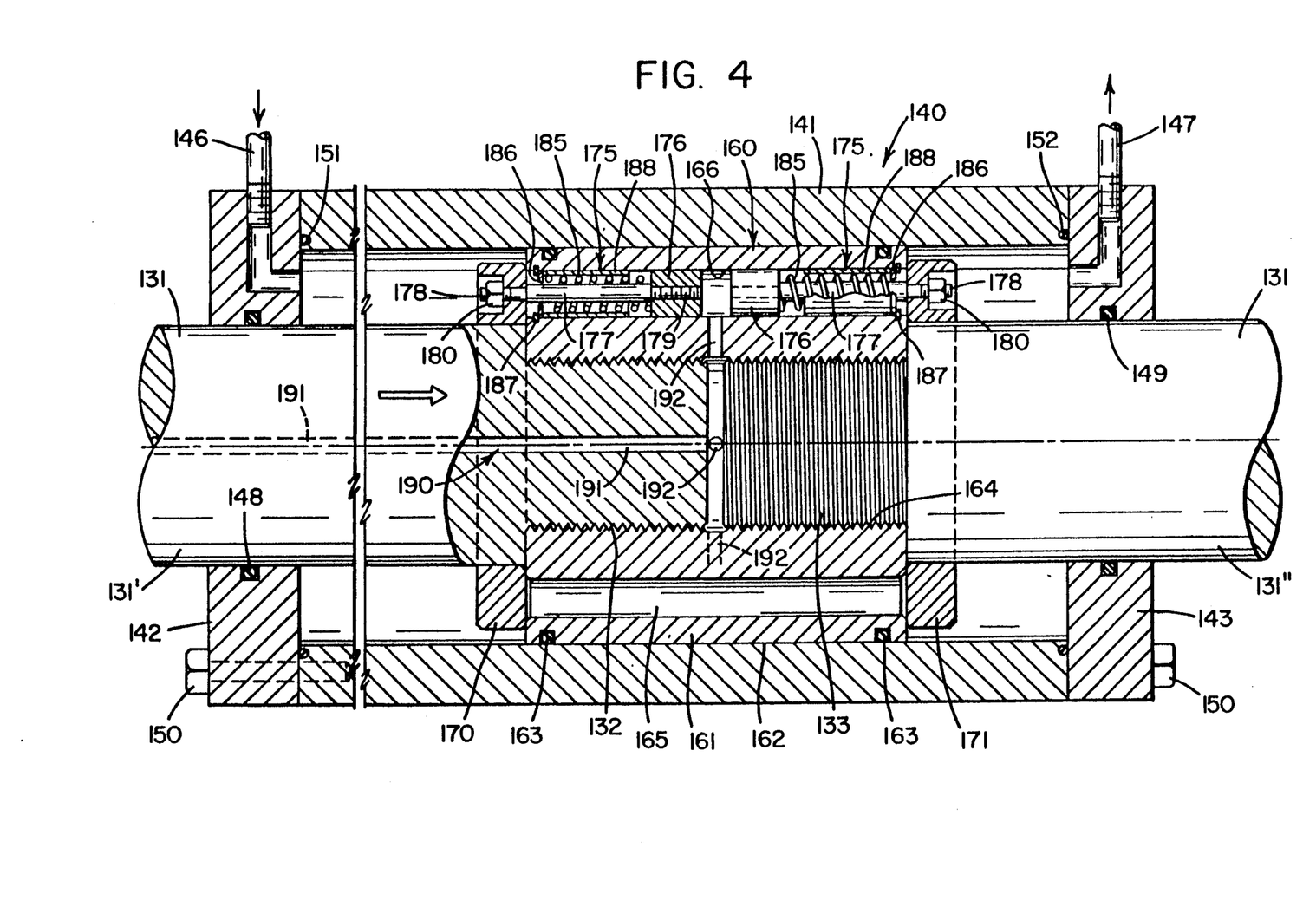
FIG. 4 is a view similar to FIG. 3, showing the pilot pistons within the piston in the closed position.
Figure 5:
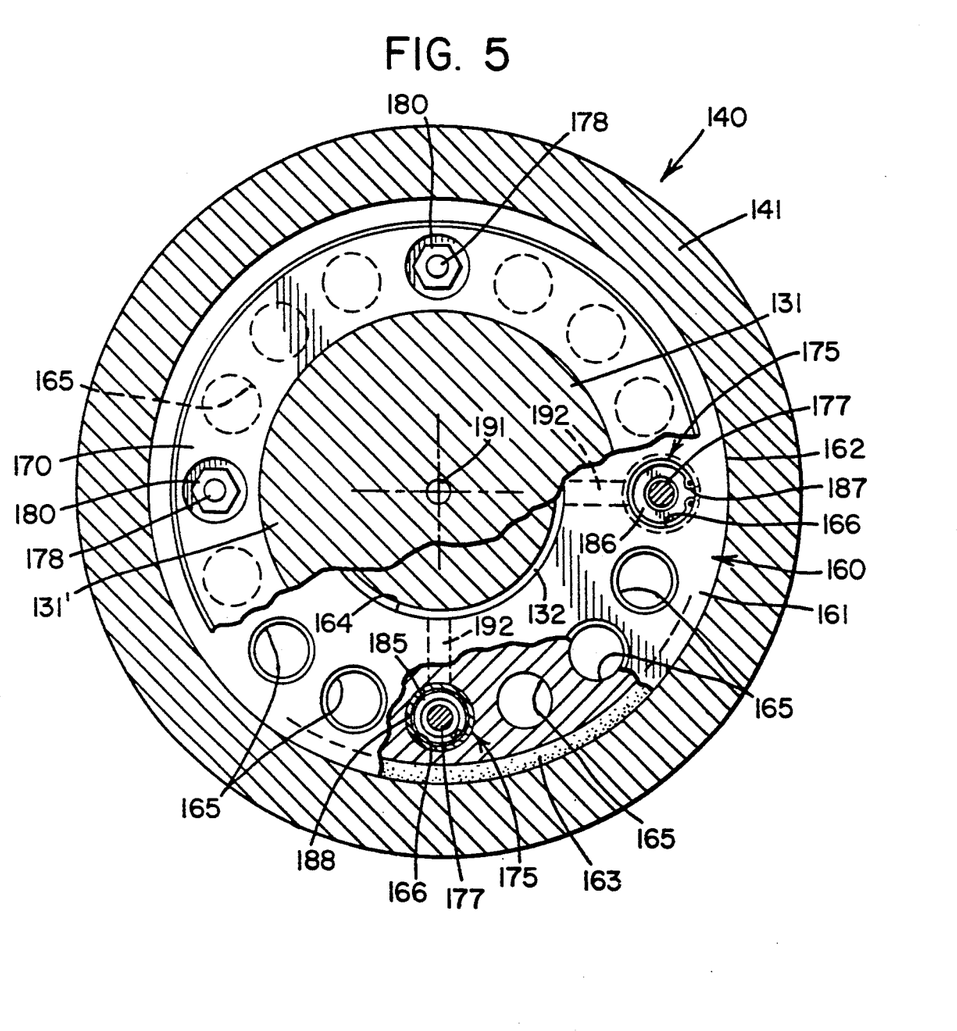
FIG. 5 is a cross-sectional view taken substantially along line 5-5 of FIG. 3, showing the circumferential location of the through bores in the piston and the selective positioning of pilot pistons therein.

With increasingly larger forms of the press 10 to mold larger parts with the attendant greater clamping tonnage requirements, the size of the cylinder assemblies 40 of press 10 must proportionately increase in size. This necessitates increasingly larger and more expensive hydraulic systems to provide the requisite flow of hydraulic fluid to and from the cylinder assemblies 40. An alternate embodiment of cylinder assembly, generally indicated by the numeral 140, as seen in FIGS. 3-5, inclusive, of the drawings, becomes increasingly advantageous with the increase in size of the press 10 and the components thereof.

In a manner similar to the cylinder assemblies 40, the cylinder assemblies 140 include elongate cylinder casings 141 which are rigidly attached, as are cylinder casings 41, to the base assembly 13 and may be of a comparable number and similarly located. The cylinder casings 141 each have rod end caps 142 and 143 at each axial extremity thereof through which guide rods 131, which are comparable to the guide rods 31 of rod assemblies 30, extend. Each of the rod end caps 142, 143 have ducts 146 and 147, respectively, for the ingress and egress of fluid to the interior of the cylinder casing 141 in a manner also described hereinafter. As detailed in FIGS. 3 and 4 of the drawings, the rod end caps 142, 143 may be provided with suitable O-rings 148 and 149, respectively, which sealingly engage the rod end caps 142, 143, and may be provided with a plurality of circumferentially spaced machine screws 150 to effect detachable attachment of the rod end caps 142, 143 to the cylinder casings 141. O-rings 151 and 152 may be mounted in the cylinder casings 141 to effect sealing engagement of the rod end caps 142 and 143, respectively.

The guide rods 131 also mount a piston, generally indicated by the numeral 160, which differs in structure and operation from the pistons 44. One of the four pistons 160 is described hereinafter, with it being understood that pistons 160 would be provided in each of the four cylinder assemblies 140. In the form shown in FIGS. 3-5, inclusive, the piston 160 has an annular sleeve 161 having a radially outer surface 162 adapted to slidably engage the inner diameter of the cylinder casing 141 in conventional fashion. The sleeve 161 may carry O-rings 163 in radially outer surface 162 to effect sealing engagement with the radially inner surface of the cylinder casing 141. The sleeve 161 has a threaded radially inner surface 164 extending substantially the entire axial length thereof. As shown, the guide rod 131 is constructed in two parts 131' and 131", with each terminating at one end in a reduced diameter threaded stub shaft 132 and 133, respectively. The stub shafts 132 and 133 are threaded into the threaded radially inner surface 164 of the sleeve 161, such that the guide rod parts 131', 131" form a continuous guide rod 131 having a piston 160 mounted thereon.

For purposes of providing fluid transfer within each cylinder assembly 140 from one side of the piston 160 to the other, the sleeve 161 of piston 160 is provided with a plurality of through bores 165 which are located in sleeve 161 in a position radially outwardly of the guide rod 131. As seen in FIG. 5, twelve circumferentially-spaced through bores 165 are provided in the sleeve 161; however, the number, size, and location of bores 165 can be varied to accommodate different fluid transfer requirements.

The through bores 165 are selectively plugged and opened to fluid passage by annular disks 170 and 171 positioned proximate the axial extremities of the sleeve 161. The disks 170, 171 are attached to and selectively movable relative to the sleeve 161 by virtue of a plurality of pilot piston mechanisms, generally indicated by the numeral 175, positioned in a plurality of bores 166 extending through sleeve 161. As seen in FIG. 5 of the drawings, four bores 166 are provided at spaced circumferential locations to house the pilot piston mechanisms 175. As shown, these four bores 166 are located at approximately 90-degree intervals about the circumferential extent of the sleeve 161. It will be appreciated that at least three and preferably four or more pilot piston mechanisms 175 would normally be employed to effect the requisite movement of the disks 170, 171, while maintaining optimum alignment and control of disks 170, 171 during their movement.

It is also to be noted that a pair of pilot piston mechanisms 175 are located in each of the four bores 166. The pilot piston mechanisms 175, 175 in any giben bore 166 have spaced opposed pistons 176, as best seen in FIGS. 3 and 4. The pistons 176 carry pilot piston rods 177 having threaded axial extremities 178 and 179. The threaded extremity 178 of each of the pilot piston rods 177 extends through and is attached to either disk 170 or disk 171 as by a nut 180. The threaded ends 179 of each pilot piston rod 177 are threaded into the pistons 176.

The pilot piston mechanisms 175 have the pilot pistons 176 biased by compression springs 185 to the position depicted in FIG. 4 of the drawings, with the disks 170, 171 in engagement with the sleeve 161 to block the through bores 165. The compression springs 185 are interposed between the pilot pistons 176 and a washer 186, which is axially restrained within bores 166 as by a snap ring 187. It will thus be appreciated that the compression springs 185 normally bias the disks 170, 171 to the position depicted in FIG. 4 of the drawings.

The actuation of the pilot piston mechanisms 175 to move the disks 170, 171 to the open position depicted in FIG. 3 of the drawings is effected by a pilot pressure system, generally indicated by the numeral 190. The pilot pressure system 190 consists of a central axial bore 191 in guide rod 131 from one axial extremity thereof to the other and terminating intermediate the piston 160, preferably substantially at the juncture of the threaded stub shafts 132, 133. At the termination of axial bore 191, there are four radial bores 192 extending to and communicating with each of the bores 166 having pilot piston assemblies 175 and particularly in the space between the pilot pistons 176 when the disks 170, 171 are blocking the through bores 165. Fluid is introduced to pilot pressure system 190 and each of the bores 166 with sufficient pressure to move the opposed pilot pistons 176 into engagement with stop sleeves 188 (FIG.3) which are axially restrained by washers 186 and the snap rings 187.

In operation, one piston 160 of the cylinder assemblies 140 is depicted in FIG. 4 proximate to but displaced from the rod end cap 143 of the cylinder assembly 140. With the through bores 165 of the piston 160 blocked by the disks 170, 171, the piston 160 is operative as a conventional piston, such as piston 44 of FIG. 1. As such, the ingress of fluid through rod end cap 142 and the egress of fluid through rod end cap 143 would serve to apply clamping tonnage to a mold in mold mounting space 15 of FIG. 1 of the drawings.

Upon completion of an injection and cure cycle in the mold mounting space 15, there may be a short stroke stripping cycle moving piston 160 to the left on the order of a fraction of an inch effected by a brief introduction of fluid through rod end cap 143 and the egress of fluid through rod end cap 142. Thereafter, the press 10 would be ready for fast opening of the mold in mold mounting space 15 and closing the mold in mold mounting space 16. Preparatory thereto, fluid would be supplied via the pilot pressure system 190 from a remote source (not shown) via the bores 191 and 192 to actuate the pilot piston mechanisms 175 to move the disks 170, 171 to the open position depicted in FIG. 3 of the drawings. Thereupon, actuation of auxiliary cylinder assembly 70 by the supply of pressurized fluid to duct 79 would effect relative movement between the piston 160 and the cylinder casing 141 and the hydraulic fluid therein. It will be understood that in the event of movement of the bolsters 11, 12 relative to the base 13, as depicted in FIG. 1, the piston 160 would move relative to cylinder assembly 140 and the hydraulic fluid therein. In the instance of the base 13 moving relative to the bolsters 11, 12, the cylinder assembly 140 and the hydraulic fluid therein would move relative to the piston 160. In either instane, the through bores 165 are of such a number and diameter such that the requisite relative motion can be achieved with minimal fluid resistance so that movement of the press 10 to open one mold and close the other mold may be accomplished in a few seconds, without the necessity for fluid flow externally of the cylinder assemblies 140.

From the position depicted in FIG. 4, the piston 160, with the through bores 165 open, would by the introduction of hydraulic fluid to auxiliary cylinder assembly 70 be displaced relative to cylinder assembly 140 to a position where piston 160 is proximate to but spaced from the rod end cap 142, at which time the supply of fluid to auxiliary cylinder assembly 70 is discontinued. Fluid pressure to the pilot pressure line system 190 would then be discontinued, and the disks 170, 171 would return to the position depicted in FIG. 4, wherein the through bores 165 are blocked. Thereafter, clamping tonnage would be applied to the mold in mold mounting space 16 by the application of hydraulic fluid through rod end cap 143 and the egress of hydraulic fluid through rod end cap 142. Subsequent to the injection and curing cycle in mold mounting space 16, there may again be a short stroke stripping cycle effected by a brief introduction of fluid through rod end cap 142 and the egress of fluid through rod end cap 143. Thereafter, the hydraulic fluid input through rod end cap 142 would be terminated and pressurized fluid would be introduced through the pilot pressure system 190 to return piston 160 to the open condition of the through bores 165, as depicted in FIG. 3. The auxiliary cylinder assembly 70 would then be actuated by the supply of pressurized fluid to duct 78 to effect relative motion between the piston 160 and the cylinder assembly 140 and the hydraulic fluid therein to return the piston 160 to the position in cylinder assembly 140 depicted in FIG. 4 of the drawings. It will thus be appreciated that the piston 160 can be readily operated to effect rapid relative movement between the bolsters 11, 12 and the base 13 of the press 10 without the necessity for the external transfer of large quantities of hydraulic fluid, thereby eliminating the necessity for numerous hydraulic system components and the attendant large piping which would otherwise be required.

Thus, it should be evident that the molding press for producing molded parts of resins disclosed herein carries out the various objects of the invention as set forth above and otherwise constitutes an advantageous contribution to the art. As may be apparent to persons skilled in the art, modifications can be made to the embodiments disclosed herein without departing from the spirit of the invention, the scope of the invention being limited solely by the scope of the attached claims.

I claim:

1. A molding press for simultaneously operating a pair of molds, each having a pair of mold sections, comprising, a single base means for mounting two horizontally displaced mold sections, each constituting one section of one of the pair of molds, first bolster means for mounting a mold section in alignment for mating engagement with one mold section on said base means, second bolster means for mounting a mold section in alignment for mating engagement with the other mold section on said base means, rod means for interconnecting said first bolster means and said second bolster means in fixed spaced relation, for guiding relative movement between said base means and said bolster means during opening and closing of the pair of molds, and for mounting piston means operatively interrelated with cylinder means on said base means, and means for effecting relative movement between said base means and said bolster means for opening of one of the pair of molds while closing the other of the pair of molds and vice versa, said base means being fixedly mounted, and said bolster means being movably mounted.

2. A press according to claim 1, wherein said base means is mounted on a fixed pad, and said bolster means are supported by transport means.

3. A press according to claim 2, wherein said transport means includes rail means extending in the direction of movement of said bolster means and wheel means engaging said track means.

4. A press according to claim 3, wherein said rail means includes a pair of spaced parallel rails and said wheel means include a pair of rows of a plurality of wheels, one row engaging one of said pair of rails and the other row engaging the other of said pair of rails.

5. A press according to claim 3, wherein shock absorber means are positioned on said rails proximate the extremities thereof for limiting movement of said bolster means.

6. A press according to claim 1, wherein said cylinder means includes cylinder casing means mounted on said base means for receiving said piston means on said rod means.

7. A press according to claim 1, wherein said means for effecting relative movement between said base means and said bolster means is fluid inlet and outlet means in said cylinder casing means for the controlled ingress and egress of fluid therefrom.

8. A press according to claim 1, wherein said rod means are attached to said first bolster means and said second bolster means, and said piston means are positioned substantially medially of said rod means.

9. A press according to claim 1, wherein said means for effecting relative movement between said base means and said bolster means is auxiliary cylinder means interconnecting said base means and said bolster means.

10. A press according to claim 9, wherein said cylinder means has cylinder casing means having fluid inlet and outlet means operative with said piston means to apply clamping forces to the molds.

11. A press according to claim 10, wherein said auxiliary cylinder means is of substantially less capacity than said cylinder casing means.

12. A molding press for operating a mold having a pair of mold sections comprising, first bolster means for mounting a first mold section in alignment for mating engagement with a second mold section, second bolster means for mounting said second mold section in alignment for mating engagement with said first mold section, and rod means for interconnecting said first bolster means and said second bolster means in fixed spaced relation and for mounting piston means operatively interrelated by fluid means with cylinder means on one of said bolster means, said piston means having fluid transfer means for selectively providing for relative displacement between said piston means and said fluid means in said cylinder means during opening and closing of said first and second mold sections.

13. A press according to claim 12, wherein said fluid transfer means includes bore means in said piston means and valve means associated with said bore means for selectively blocking said bore means.

14. A press according to claim 12, wherein said bore means includes a plurality of axial through bores positioned circumferentially about said piston means, and said valve means includes plug means movable into and out of blocking engagement with said through bores.

15. A press according to claim 14, wherein said plug means are annular discs positioned at each axial extremity of said piston means and said piston has bore means having pilot piston means therein for selectively moving said discs.

16. A press according to claim 15, wherein said bore means have two pilot pistons therein, one pilot piston controlling said annular disc at one axial extremity of said piston means and a second pilot piston controlling said annular disc at the other axial extremity of said piston means, said pilot pistons having pilot piston rod means connecting said pilot pistons with one of said discs.

17. A press according to claim 16, wherein pilot pressure line means communicates with said bores between said pilot pistons therein for selectively supplying pressurized fluid to move said discs out of blocking engagement with said through bores to permit relative displacement between said piston means and said fluid in said cylinder casing means, said pilot pressure line means including bore means in said rod means and said piston means.

18. A press according to claim 17, including sleeve means in said bores for limiting the movement of said pilot pistons when said pilot pressure line means supplies pressurized fluid thereto.

19. A press according to claim 17, including biasing means normally urging said discs into blocking engagement with said through bores to prevent relative displacement between said piston means and said fluid in said cylinder casing means.

20. A press according to claim 19, wherein said biasing means is a spring interposed between said pilot pistons and retainer means in said bore means.

21. A press according to claim 12, including means for effecting relative movement between said base means and said bolster means for opening one of the pair of molds while closing the other of the pair of molds and vice versa.

* * * * *

UNITED STATES PATENT AND TRADEMARK OFFICE
CERTIFICATE OF CORRECTION

PATENT NO. : 5,145,353

DATED : September 8, 1992

INVENTOR(S) : Paul Zakich, Akron, Ohio

It is certified that error appears in the above-identified patent and that said Letters Patent is hereby corrected as shown below:

Title Page, Item 57, Abstract, Delete " A molding press for simultaneously operating a pair of molds, each having a pair of mold sections (M1, M2; M3, M4), including a base for mounting two horizontally displaced mold sections (M1, M3), each constituting one section of one of the pair of molds, a first bolster for mounting a mold section M2) in alignment for mating engagement with one mold section M1) on the base, a second bolster for mounting a mold section (M4) in alignment for mating engagement with the other mold section (M3) on the base, rod assemblies for interconnecting the first bolster and the second bolster in fixed space relation, for guiding relative movement between the base and the bolsters during opening and closing of the pair of molds, and for mounting pistons operatively interrelated with cylinder assemblies on the base, and an auxiliary cylinder assembly for effecting relative movement between the base and the bolsters for opening of one of the pair of molds while closing the other of the pair of molds and vice versa. The pistons may be provided with fluid transfer bore for selectively providing for relative displacement between the pistons and fluid in the cylinder assemblies. "

UNITED STATES PATENT AND TRADEMARK OFFICE
CERTIFICATE OF CORRECTION

PATENT NO. : 5,145,353
DATED : September 8, 1992
INVENTOR(S) : Paul Zakich, Akron, Ohio It is certified that error appears in the above-identified patent and that said Letters Patent is hereby corrected as shown below:

and insert -- A molding press (10) for simultaneously operating a pair of molds, each having a pair of mold sections (M1, M2; M3, M4), including a base (13) for mounting two horizontally displaced mold sections (M1, M3), each constituting one section of one of the pair of molds, a first bolster (11) for mounting a mold section (M2) in alignment for mating engagement with one mold section (M1) on the base, a second bolster (12) for mounting a mold section (M4) in alignment for mating engagement with the other mold section (M3) on the base, rod assemblies (30) for interconnecting the first bolster and the second bolster in fixed space relation, for guiding relative movement between the base and the bolsters during opening and closing of the pair of molds, and for mounting pistons (44, 160) operatively interrelated with cylinder assemblies (40, 140) on the base, and an auxiliary cylinder assembly (70) for effecting relative movement between the base and the bolsters for opening of one of the pair of molds while closing the other of the pair of molds and vice versa. The pistons (160) may be provided with fluid transfer bores (165) for selectively providing for relative displacement between the pistons (160) and fluid in the cylinder assemblies (140).

Signed and Sealed this

First Day of February, 1994

*Attest:*

BRUCE LEHMAN

*Attesting Officer*  Commissioner of Patents and Trademarks